United States Patent Office 3,259,817
Patented July 5, 1966

3,259,817
ELECTRICAL CAPACITORS HAVING A POLYMER COMPOSITION AS A DIELECTRIC
Leon Adany, Champigny-sur-Marne, France, assignor to Electro-Organics, Inc., New York, N.Y., a corporation of New York
No Drawing. Filed Feb. 6, 1962, Ser. No. 171,530
7 Claims. (Cl. 317—258)

This invention relates to electrical capacitors. More particularly, the invention is concerned with capacitors in which the dielectric is a novel polymer composition comprising a combination of a polymerized olefinically unsaturated monomer with a polymeric substituted phosphorus nitride.

Capacitors are known in which two or more metal electrodes are separated by a dielectric spacing material such as a spacer sheet. The spacer sheet may be a film of a synthetic resin, or may comprise a porous sheet, such as kraft paper, impregnated with a liquid dielectric impregnant. The use of such liquid dielectric impregnants results in conventional liquid filled capacitors, and requires that leak-proof casings be provided, and thus has inherent constructional and economic disadvantages. Even where the liquid impregnant is polymerizable, it is customary to provide an auxiliary encapsulating resin coating, which adds to bulkiness and cost of the finished capacitor.

In accordance with the present invention there is provided an electrical capacitor in which the dielectric spacing material between the electrodes is a solid polymer composition comprising a combination of a polymerized olefinically unsaturated monomer with a polymeric unsubstituted phosphorus nitride. The polymer composition may be employed as a dielectric material either in the form of sheets or films, or as a solid impregnant for a porous or fibrous spacer material.

It has not been definitely established whether the polymer combination of the invention is a copolymer or a blend of the olefinically or ethylenically unsaturated monomer and the phosphorus nitride. Accordingly, the product of polymerization is referred to herein as a polymer combination.

The general method of preparation of the novel polymer combinations employed in this invention includes the steps of polymerizing an ethylenically unsaturated monomer in the presence of a substituted phosphorus nitride and in the presence of a suitable polymerization catalyst for the ethylenically unsaturated monomer. Mass or bulk polymerization is the preferred method of polymerization of the monomer.

Under some circumstances of use of the dielectric material, it has been found advantageous to subject the material to ionizing radiation which imparts a limited electrical conductivity to the material. The ionizing radiation may be provided by incorporating into the polymer combination a radioactive material. This is advantageously carried out by dissolving both the polymer combination and the emissive substance in a common solvent. In order to control the conductivity of the resulting composition more closely, there may also be incorporated into the polymer combination a small amount of a metal salt of an inorganic acid, particularly a salt which is soluble in the solvent medium employed for incorporating the emissive substance.

Olefinically unsaturated monomers which are suitable for polymerization in accordance with the invention include both aliphatic and aromatic monomers. Examples of such monomers include styrene, and the nitriles of $\alpha,\beta$-unsaturated acids, such as acrylonitrile, methacrylonitrile, fumaronitrile, the nitriles of maleic, mesaconic, itaconic, citraconic, and like acids, esters, amides, and other derivatives of acrylic, methacrylic, and other $\alpha$-substituted acrylic acids, such as the lower alkyl esters of acrylic and methacrylic acids, for example, methyl acrylate, ethyl acrylate, methyl methacrylate, ethyl methacrylate, propyl methacrylate, and butyl methacrylate, and the amides acrylamide and methacrylamide.

The polymerization of the ethylenically unsaturated monomer is carried out in accordance with conventional methods employing bulk or mass polymerization, in the presence of a free radical or similar type polymerization catalyst. Suitable catalysts of the free radical type include both peroxide type catalysts and azo types. The peroxide type catalysts which may be employed include benzoyl peroxide, di-tertiary-butyl peroxide, tertiary butyl hydroperoxide, diacetyl peroxide, dilauroyl peroxide, cumene hydroperoxide, hydrogen peroxide, potassium persulfate, and sodium perborate. Azo type catalysts include azomethane, $\alpha,\alpha'$-azodi-isobutyro-nitrile, and the like. The amount of catalyst may be varied over a wide range, the amount preferably being from about 1% to about 5% by weight of the monomer.

The polymerization of the ethylenically unsaturated monomer, in accordance with the invention, is carried out in the presence of a substituted phosphorus nitride. The ethylenically unsaturated monomer and the phosphorus nitride are employed in a ratio ranging between about 3 and about 7 parts by weight of the monomer per 1 part of phosphorus nitride, and preferably between about 4.5 and about 5.5 parts by weight of monomer per 1 part of phosphorus compound.

The substituted phosphorus nitrides which may be employed to prepare polymer combinations in accordance with the invention may be monomers when such exist as stable compounds, but are generally polymeric forms, such as the trimer or the tetramer, or higher polymers. They are known compounds and are commercially available.

The substituted phosphorus nitrides have the general formula $(PNX_2)_n$, wherein X is a substituent such as halogen amino, alkyl, alkoxy, and aryl, and $n$ is an integer denoting the degree of polymerization.

A typical example of a substituted phosphorus nitride which may be employed in accordance with the invention is phosphonitrilic chloride. The monomeric form of this compound, which is unstable, may be prepared by treating phosphorus nitride with chlorine, or by reacting phosphorus pentachloride with ammonium chloride. The stable lower polymers, such as the trimer and the tetramer, are solids having melting points of 114° C. and 123.5° C., respectively. Higher polymers up to and including the heptamer are also known. The manufacture of these compounds is disclosed, for example, in U.S. Patents No. 2,788,286 and No. 2,872,283. Other phosphonitrilic halides may also be employed, such as polymeric phosphonitrilic bromide and fluoride.

Other phosphorus nitrides which may be employed include the amino derivative $[PN(NH_2)_2]_n$, the methoxy derivative $[PN(OCH_3)_2]_n$, the methyl derivative $$[PN(SCH_3)_2]_n$$

and the phenyl derivative $[PN(C_6H_5)_2]_n$, wherein $n$ is generally 3 or 4.

The polymerization temperature may be varied within wide limits. Generally a temperature range of about 35° C. to about 90° C. is satisfactory. The mixture of ethylenically unsaturated monomer, substituted phosphorus nitride, and catalyst is placed in a suitable vessel, which is flushed with an inert gas to remove air. The vessel and contents are heated to the selected temperature. As the reaction progresses a generally whitish polymeric mass forms. Agitation is preferably employed to prevent localized overheating. Any excess of unpolymerized monomer remaining is removed by evaporation.

There may be introduced into the polymer combination materials which impart specifically desired properties. Thus, for example, there may be included, in proportions up to about 60% by weight of the polymer combination, a material which aids in promoting adherence to metal surfaces, such as molybdenum disulfide, $MoS_2$.

The resulting polymer combinations possess dielectric constants of an order of magnitude sufficient to permit them to function effectively as dielectric spacer materials in capacitors. Tests have indicated that the dielectric constant of the polymer combination when assembled into a capacitor is at least 20 and some materials fabricated in accordance with the invention have exhibited still higher dielectric constants.

The polymer combination may be cast or extruded onto a flat surface with evaporation of the solvent. This operation may be repeated until the desired film thickness is attained, for example a layer about 0.2 mm. in thickness. The layer or film may then be cut, punched, or otherwise reduced to the desired size and shape.

The polymer combination obtained, as previously described, may be subjected to continuous ionizing radiation in order to convert it into a product having limited conductive properties, employing for this purpose, a radiation emissive substance. The choice of ionizing radiation emissive substance is made in accordance with the desired type of radiation, which may be, for example, of the alpha, beta, or gamma types. These types of radiation may be supplied by naturally occurring radioactive materials, such as radium or uranium or their compounds, or by fission by-products of processes generating atomic energy, or other fissionable materials.

Thus, for example, there may be employed as a source of alpha-radiation, a salt of naturally occurring uranium (U-238), such as uranyl nitrate. Similarly, there may be employed as a source of beta-radiation, a salt of a radioactive element such as prometheum, strontium-90, yttrium-90, cerium-144 or germanium-68, for example prometheum chloride. The middle of the range radiation intensity of uranyl nitrate is about 3 millicuries, while that of prometheum chloride is about 1 millicurie. Another source of beta-radiation is tritium, which may be applied as tritiated water or as a tritiated carrier, such as tritium containing ethyl stearate or tritium containing Vaseline, providing an intensity in the range of 10 microcuries to 1 curie.

As a source of gamma-radiation there may be employed materials made radioactive by exposure to neutron radiation, for example, salts of radioactive cobalt (Co-60) or europium-152 or 154.

The amount of ionizing radiation emissive substance to be employed may vary widely, but should be at least sufficient to bring about a significant increase in the conductivity of the polymer combination. Thus, for example, there may be used a solution of uranyl nitrate having a specific radiation intensity of 9 millicuries per gram, in a concentration of 2 parts by weight per 3 parts of polymer blend. Similarly, prometheum chloride solution in water may be employed in an amount to provide a radiation intensity of 1 millicurie per 3 grams of polymer blend. Or tritiated water containing 50 curies per ml. may be employed in an amount of about 0.01 ml. per 3 grams of polymer combination. In general, the amount of emissive substance, whether in the form of an aqueous solution or distributed within a carrier, should be enough to provide at least about 0.1 millicurie per gram of polymer combination.

The incorporation of the radiation emissive substance into the polymer combination is advantageously carried out by dissolving both the polymer combination and the emissive substance in a solvent medium which is a solvent for both materials. The concentration of the polymer combination in the solvent medium is adjusted to a range between about 10% and about 30% by weight, preferably about 20% by weight of the solvent medium. The emissive substance is introduced into the resulting solution.

However, if desired, the emissive substance may also be introduced into the polymer combination by incorporation with the original polymerization mixture, or during any stage of the polymerization process.

Where a solvent medium is employed, the solvent may be a dialkylamide of a lower aliphatic carboxylic acid, such as dimethylformamide or dimethylacetamide. Other solvents which may be used include dimethyl sulfoxide, N-methylpyrrolidone, and tripropylene carbonate. The preferred solvent is dimethylformamide.

The resulting solution of polymer combination and emission substance is then cast or extruded into sheets or thin films, as desired, in accordance with conventional procedures.

There may also be added to the solution of polymer combination and emissive substance, a small amount, between about 0.1% and about 2% by weight of the polymer combination, and preferably about 0.1% of a metal salt of an inorganic acid which is soluble in the solvent medium employed. The metal salt may be added before or after the introduction of the emissive substance. Examples of suitable metal salts include the halides, nitrates, and to a lesser extent the sulfates of the alkali metals, such as ammonium, potassium, and sodium, calcium nitrate, and salts of heavy metals, such as cobalt, cadmium, chromium, iron (ferric), mercury (ic) nickel, tin (stannous) and zinc. Specific examples of metal salts include aluminum nitrate, cadmium nitrate, cobalt chloride and nitrate, chromium chloride, copper nitrate, mercuric chloride, potassium iodide, manganese chloride, sodium and potassium thiocyanates, sodium iodide, ammonium bromide, ammonium nitrate, nickel chloride and nitrate, stannous chloride, zinc chloride, nitrate and sulfate. The preferred salt is zinc chloride.

The preparation of the dielectric compositions of the invention is illustrated by the following examples, which are not, however, to be considered as limiting:

*Example 1*

150 g. of acrylonitrile monomer was mixed with 30 g. of phosphonitrilic chloride (trimer). The mixture was introduced into a balloon flask provided with agitator and the mixture was thoroughly stirred to effect uniform distribution of the phosphonitrilic chloride in the acrylonitrile. Then there was introduced 6 g. of benzoyl peroxide as polymerization catalyst and the flask was flushed with nitrogen or carbon dioxide to be free of all traces of air. The flask was placed on a water bath and the contents maintained at a temperature of about 75° C. until formation of polymer was noted. Caution was taken to prevent excessive temperature rise by replacing the hot water of the bath with cold water to limit the heating. As the reaction progressed a white polymer appeared and the viscosity of the mass increased, agitation being continued to prevent hot spots. An excess of unpolymerized acrylonitrile remaining in the flask was removed by evaporation. The resulting polymer combination was a white powder. It was dissolved under reflux in dimethylformamide at the boiling point of this solvent (152–153° C.) and at a concentration of 2 g. per 10 cc.

A film was then prepared by casting the above solution on a flat surface and evaporating the solvent by infrared heating to about a film 0.2 mm. thick.

*Example 2*

The procedures of Example 1 are followed for preparation of the solution containing the polymer combination.

(a) Into one portion of the resulting solution an alpha-radiation emissive substance was introduced, using for this purpose a solution of uranyl nitrate having a specific activity of 9 millicuries per gram, in dimethylformamide, in a concentration of 1 g. uranyl nitrate per 8 cc. of solvent. The uranyl nitrate dissolved easily in this solvent on agitation at ordinary temperature. This solution was added to the polymer combination solution in a proportion such that the added uranyl nitrate was in a concentration of 2 parts by weight per 3 parts of the polymer combination. The two solutions mixed readily at ordinary temperature.

(b) Into another portion of the polymer combination solution originally obtained there was introduced a beta-radiation emissive substance comprising prometheum chloride solution in water, by pouring the radioactive solution into the polymer combination solution in proportions such that the prometheum was present in an amount to provide an activity of 1 millicurie per 3 g. of the polymer combination. The dissolution was readily effected within the range of proportions specified.

To each of the resulting solutions (a) and (b) a solution of zinc chloride in dimethylformamide was added, so that the concentration of zinc chloride was 0.1% by weight of the polymer combination. Films were then prepared by casting the respective solutions on flat surfaces and evaporating the solvent by infrared heating, to obtain films about 0.2 mm. thick.

*Example 3*

Following the procedure set forth in Example 1, 80 grams of acrylonitrile were heated with 20 grams of phosphonitrilic methoxide, and 3 grams of benzoyl peroxide catalyst were added. A solution of the polymer combination in dimethylformamide was prepared as previously described, and the solution was cast into a thin film.

*Example 4*

75 grams of methacrylonitrile were heated with 25 grams of phosphonitrilic chloride trimer at about 90° C. and 5 grams of tertiary butyl hydroperoxide catalyst, as described in Example 1. The polymer combination formed was dissolved in dimethylformamide and an amount of tritiated water having an activity of 10 curies per 50 ml. was added, said amount being 0.01 ml. of this water per 3 grams of solid in 30 cc. of dimethylformamide. The solution was treated with zinc chloride and cast into films as described in Example 1.

*Example 5*

A polymeric phosphonitrilic chloride mixture was prepared by heating 22.5 parts by weight of phosphorus pentachloride, 7.4 parts by weight of finely divided ammonium chloride, and 120 parts by weight of tetrachloroethane at a temperature of about 140° C. for 12 hours, in accordance with the method described by Schenck and Roemer, Berichte der Deutschen Chemischen Gesellschaft, vol. 57, page 1343. The excess ammonium chloride is filtered off and the solvent evaporated yielding pale brown crystals. The crystals were heated at about 300° C. at a pressure of 20 mm. Hg, resulting in the formation of phosphonitrilic chloride tetramer. Following the procedure set forth in Example 1, 150 grams of acrylonitrile monomer were mixed with 30 grams of the prepolymerized tetrameric phosphonitrilic chloride. Then 6 grams of benzoyl peroxide catalyst were added, and polymerization was completed as described in Example 1. The resulting composition was cast into a thin film.

In order to prepare a capacitor employing the novel dielectric compositions of the invention, the polymer combination film, containing the ionizing radiation emissive substance, and having a suitable thickness, for example, about 0.2 mm., is coated on both sides with a paint of a conductive material, suitably a noble metal paint, such as a silver paint of the type conventionally employed in the manufacture of rectifier devices. After the coat of paint has dried the film is contacted with and pressure-bonded to a pair of metal plate or foil electrodes, or armatures such as, for example, silver aluminum or tin electrodes. These electrodes are, in turn, connected to respective output conductors. More than one film may be included between a pair of electrodes, if desired. It is essential that the edge surfaces of the film should not be coated with conductive paint to avoid short circuiting the electrodes or armatures. The metal paint provides good contact between the coated polymer combination film and the metal electrodes. The resulting assembly may then be made into a capacitor by enclosing it in a protective insulating sheath.

An electrical capacitor of the type in which the novel dielectric material of the invention is applicable includes an assembly or body comprising one or more pairs of metal plates or armatures, spaced apart and having interposed between each pair of electrodes a thin spacer sheet or film of the dielectric polymer combination. The metal plates or foils may be of any suitable conductive metal such as aluminum, tin or silver. The metal plates project beyond the dielectric film and have attached to their edges metal conductors leading to terminal elements extending to the exterior of the capacitor casing or container. If desired, the spacer sheet may be made of a porous absorbent material such as kraft paper impregnated with the dielectric polymer combination. The assembly may be enclosed in a casing or container comprising any suitable thermoplastic or thermosetting insulating resin or molding compound such as for example epoxy, urea-formaldehyde, polystyrene, polyethylene, or phenol-formaldehyde resin. The assembly may be encapsulated by conventional molding methods using heat for the thermosetting resins or injection molding or casting in the case of the thermoplastic resins. Capacitors have thus been constructed in accordance with the invention, having a capacitance value in the range of 10–500 microfarads. The breakdown voltage of such capacitors, having a plate surface area of 1 sq. cm., was higher than 200 volts. They are suitable for use in radio circuits of conventional type.

What is claimed is:
1. An electrical capacitor comprising metal electrodes spaced from each other, and between the electrodes a dielectric polymer composition consisting essentially of a combination of a polymerized olefinically unsaturated monomer with a polymeric substituted phosphorus nitride in proportions ranging from about 3–7 parts by weight of monomer per part of nitride.

2. An electrical capacitor comprising metal electrodes spaced from each other, and between the electrodes a dielectric polymer composition consisting essentially of a combination of a polymerized olefinically unsaturated monomer with a phosphonitrilic halide polymer of the general formula $(PNHal_2)_n$ where $n$ is an integer up to 7, the proportions ranging from about 3–7 parts by weight of monomer per part of halide.

3. An electrical capacitor comprising metal electrodes spaced from each other, and between the electrodes a dielectric polymer composition consisting essentially of a combination of polymerized acrylonitrile and phosphonitrilic chloride polymer of the general formula $(PNCl_2)_n$ where $n$ is an integer up to 7, the proportions ranging from about 3–7 parts by weight of monomer per part of chloride.

4. A dielectric sheet material comprising a combination of a polymerized olefinically unsaturated monomer with a polymeric substituted phosphorus nitride according to the formula $(PNX_2)_n$ where X is a member selected from the group consisting of halogen, amino, alkyl, alkoxy, and aryl, and $n$ is in integer up to 7, the proportions ranging from about 3–7 parts by weight of monomer per part of nitride.

5. An electrical capacitor comprising a film of a polymer combination consisting essentially of a polymerized olefinically unsaturated monomer with a polymeric substituted phosphorus nitride in proportions ranging from about 3–7 parts by weight of monomer per part of nitride, said polymer combination having incorporated with the film an ionizing radiation emissive substance and a small amount of a metal salt of an inorganic acid, said film being supported between two metal plates serving as electrodes.

6. An electrical capacitor comprising a body of a polymer combination consisting essentially of a polymerized olefinically unsaturated monomer with a polymeric substituted phosphorus nitride in proportions ranging from about 3–7 parts by weight of monomer per part of nitride, said polymer combination having incorporated with the body an ionizing radiation emissive substance and a small amount of a metal salt of an inorganic acid, and electrodes secured to opposite sides of said body.

7. An electrical capacitor comprising metal electrodes spaced from each other and between the electrodes a dielectric spacer material including a polymer combination consisting essentially of a polymerized olefinically unsaturated monomer with a polymeric substituted phosphorus nitride in proportions ranging from about 3–7 parts by weight of monomer per part of nitride, said polymer combination having incorporated with the film an ionizing radiation emissive substance and a small amount of a metal salt of an inorganic acid.

References Cited by the Examiner

UNITED STATES PATENTS

| | | | |
|---|---|---|---|
| 2,749,490 | 6/1956 | Robinson et al. | 317—258 |
| 2,797,373 | 6/1957 | Peck | 317—258 |
| 2,999,085 | 9/1961 | King et al. | 260—85 |
| 3,062,792 | 11/1962 | McConnell et al. | 260—85 |

ROBERT K. SCHAEFER, *Primary Examiner.*

JOHN P. WILDMAN, JOHN F. BURNS, *Examiners.*

W. F. ZAGURSKI, D. J. BADER, *Assistant Examiners.*